United States Patent
Wawro et al.

(10) Patent No.: US 7,021,824 B2
(45) Date of Patent: Apr. 4, 2006

(54) SWITCH ASSEMBLY FOR THERMOMETRY APPARATUS

(75) Inventors: Thaddeus J. Wawro, Auburn, NY (US); Daniel R. Sommers, Skaneateles, NY (US); Christopher M. Keegan, Marcellus, NY (US)

(73) Assignee: Welch Allyn, Inc., Skaneateles Falls, NY (US)

( * ) Notice: Subject to any disclaimer, the term of this patent is extended or adjusted under 35 U.S.C. 154(b) by 0 days.

(21) Appl. No.: 10/689,272

(22) Filed: Oct. 20, 2003

(65) Prior Publication Data

US 2005/0083994 A1    Apr. 21, 2005

(51) Int. Cl.
*G01K 1/14* (2006.01)

(52) U.S. Cl. .................. 374/208; 600/549; 374/141

(58) Field of Classification Search ............. 374/208, 374/183, 158, 209, 163, 170, 194, 100

See application file for complete search history.

(56) References Cited

U.S. PATENT DOCUMENTS

| | | | | | |
|---|---|---|---|---|---|
| 3,530,718 | A | * | 9/1970 | Ehlo | 374/158 |
| 3,946,613 | A | * | 3/1976 | Silver | 374/183 |
| 4,007,832 | A | * | 2/1977 | Paull et al. | 374/209 |
| 4,399,824 | A | * | 8/1983 | Davidson | 600/549 |
| 4,572,365 | A | * | 2/1986 | Bruno et al. | 206/306 |
| 4,619,271 | A | * | 10/1986 | Burger et al. | 600/549 |
| 4,727,500 | A | * | 2/1988 | Jackson et al. | 702/131 |
| D300,728 | S | * | 4/1989 | Ross | D10/57 |
| 6,036,361 | A | * | 3/2000 | Gregory et al. | 374/185 |
| 6,186,959 | B1 | * | 2/2001 | Canfield et al. | 600/559 |
| 6,355,916 | B1 | * | 3/2002 | Siefert | 219/494 |
| 6,439,768 | B1 | * | 8/2002 | Wu et al. | 374/169 |
| 6,634,789 | B1 | * | 10/2003 | Babkes | 374/208 |
| 6,698,921 | B1 | * | 3/2004 | Siefert | 374/169 |
| 6,827,488 | B1 | * | 12/2004 | Knieriem et al. | 374/209 |
| 2004/0071188 | A1 | * | 4/2004 | Knieriem et al. | 374/163 |

* cited by examiner

*Primary Examiner*—Gail Verbitsky
(74) *Attorney, Agent, or Firm*—Peter J. Bilinski

(57) ABSTRACT

A thermometry apparatus includes a housing that receives a probe having at least one temperature responsive element within an isolation chamber that is preferably removable from the housing. A switch assembly determines the presence of the isolation chamber in the housing wherein the apparatus is enabled only if the isolation chamber is attached to the housing and a probe is removed from the attached isolation chamber.

7 Claims, 3 Drawing Sheets

SWITCH ASSEMBLY FOR THERMOMETRY APPARATUS

FIELD OF THE INVENTION

This invention relates to the field of thermometry, and in particular to a thermometry apparatus having a switch assembly that powers the apparatus only when an isolation chamber is attached to an apparatus housing and automatically powers the apparatus when both the isolation chamber is attached to the apparatus housing and the elongate temperature measuring probe is removed from the attached isolation chamber.

BACKGROUND OF THE INVENTION

Thermometry apparatus are known in the field, such as those that are described in U.S. Pat. Nos. 5,632,555, 6,000,846, and 6,036,361, for measuring the temperature of a patient at a body site including the axilla, the mouth or other body cavity. In these references, an elongate probe having a distally positioned temperature responsive element, such as, for example, a thermistor, is used to measure patient body temperature through direct placement of the probe at the body site. The probe is tethered to a housing that includes internally disposed processing circuitry for processing a signal from the temperature responsive element of the elongate probe. The resulting processed temperature signal is subsequently outputted onto a display that is located on a front face side of the housing adjacent a user interface, the interface including a series of user actuable buttons for controlling other features of the thermometry apparatus.

Typically and to avoid contamination of the remainder of the housing, the elongate probe is stored within the housing, when not in use, and more particularly within the confines of a hollow isolation chamber, also referred to commonly as a probe well, such as that as described in U.S. Pat. No. 4,008,614. The isolation chamber can be releasably attached relative to a cavity formed in the housing, the chamber preferably having a fluid tight seal in order to prevent contaminants from the elongate probe from reaching the contained resident processing circuitry.

The design of the probe well is often made so as to streamline the appearance of the thermometry housing. As a result, it is possible that a user could inadvertently insert a probe into the housing cavity without an isolation chamber first being attached. Contamination and reduced life of the apparatus are likely results.

SUMMARY OF THE INVENTION

It is a primary object of the present invention to minimize or eliminate the above noted deficiencies of the prior art.

It is a further primary object of the present invention to provide a thermometry apparatus that conserves power more efficiently than previously known devices.

It is yet another primary object of the present invention to reduce or minimize the incidence of contamination caused by improper placement of an elongate probe assembly into a thermometer housing.

It is still a further object of the present invention to provide an effective means for detecting when the isolation chamber is effectively attached to a thermometry apparatus.

Therefore and according to a preferred aspect of the present invention, there is provided a thermometry apparatus comprising:

a housing;

a probe assembly including an elongate probe having at least one temperature responsive element;

an isolation chamber having a cavity for receiving said probe, said isolation chamber being removable from said housing; and a first switch assembly for detecting when said isolation chamber is attached to said housing, said first switch assembly including means for powering said thermometry apparatus only when isolation chamber is attached to said housing.

Preferably, the first switch assembly is attached to a shroud assembly into which the isolation chamber is inserted. When the isolation chamber has been inserted a predetermined distance into the shroud assembly, the first switch assembly automatically powers up the thermometry apparatus.

According to a preferred embodiment, a second switch assembly used in conjunction with the first switch assembly determines the presence of a probe in the isolation chamber. Preferably, the thermometry apparatus is then automatically powered when the first and second switch assemblies are each enabled; that is, when the isolation chamber is attached to the thermometry housing and the elongate probe has been removed from the attached isolation chamber.

The first and second switch assemblies according to the present invention can be mechanical, optical, magnetic or assume other suitable forms to achieve the above desired purposes.

According to another aspect of the invention, there is provided a method for automatically powering a thermometry apparatus, said apparatus including an elongate probe having at least one temperature sensitive element that is stored within a housing, said method comprising the steps of:

determining whether an isolation chamber is present in said thermometry apparatus housing;

automatically determining whether an elongate probe has been removed from said attached isolation chamber; and automatically powering said apparatus if said isolation chamber has been determined to be attached to said housing and a probe has been removed from the isolation chamber.

An advantage of the present invention is that a thermometer apparatus can be configured to operate more effectively than previously known devices.

A further advantage of the present invention is that less overall maintenance is required and that a thermometry apparatus incorporating the inventive features described herein will have a longer useful lifespan.

These and other objects, features and advantages will become readily apparent from the following Detailed Description which should be read in conjunction with the accompanying drawings.

DETAILED DESCRIPTION

The following description refers to a preferred embodiment of a thermometry apparatus having a specific switch assembly made in accordance with the present invention. It will be readily apparent to one of adequate skill, however, that variations and modifications are possible that embody the inventive concepts discussed herein. In addition, certain terms are used throughout the discussion in order to provide a proper frame of reference with regard to the accompanying drawings. These terms, however, are not intended to be overly limiting, except where specifically indicated.

Figure 1:
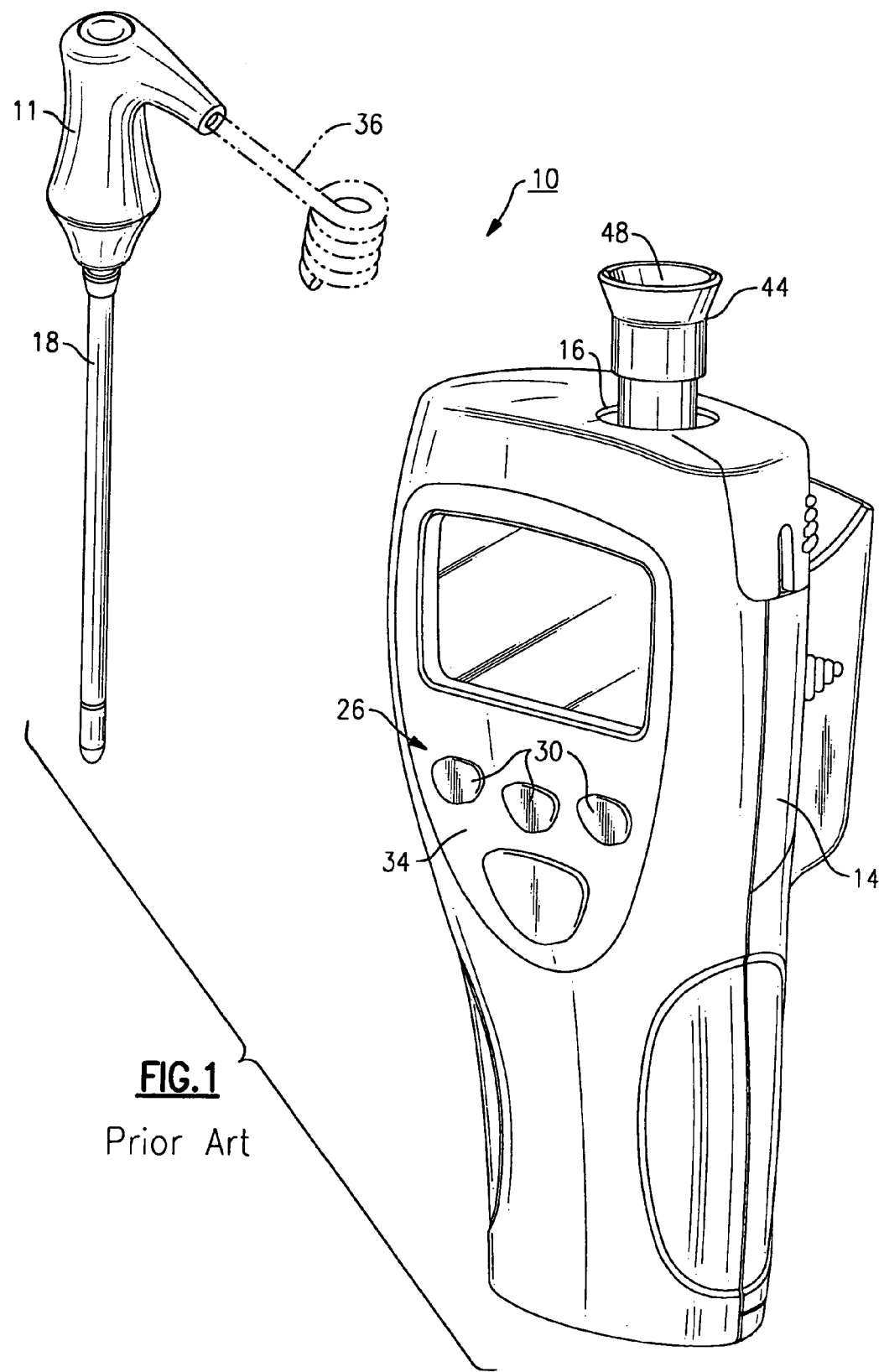
FIG. 1 is a side elevational view of a thermometry apparatus made in accordance with the prior art.

Referring to FIG. 1, there is shown a prior art thermometry apparatus 10, discussed herein for background purposes, the apparatus including a compact housing 14. The housing further includes a display 22 as well as a user interface 26 defined by a series of user actuable control buttons 30 located on a front facing surface 34 thereof. An elongate probe 18 that includes a stainless or other conductive member having a distal contained temperature responsive element (not shown), such as a thermistor or thermocouple, is used in conjunction with the apparatus 10. The probe 18 includes a upper or proximal handle portion 11. The housing 14 includes processing circuitry (not shown), that is placed within the confines of the housing 14.

The elongate probe 18 is tethered to the thermometry housing 14 by means of a cable 36 that is attached at one end to the handle portion 11 of the probe 18. A probe connector (not shown) is attached to the remaining end of the cable 18, this connector being attachable to a corresponding socket (not shown) that is provided in an upper portion of the housing 14.

The probe 18 is housed within the confines of a hollow isolation chamber or probe well 44 that is releasably attached within an internal cavity 16 of the housing 14 and is fitted within an appropriately sized cavity 48 of the isolation chamber.

Having described the major components of a typical thermometry apparatus, FIGS. 2–5 illustrate an interior portion of a thermometry apparatus 50 in accordance with the present invention. For purposes of this embodiment, all of the above features of the thermometry apparatus of FIG. 1 are incorporated into the herein described apparatus, including the housing 14, the display 22, the user interface 26, and the probe 18, the latter being shown in FIGS. 2, 4 and 5.

An isolation chamber 54 is fittable within a shroud tube 58 that is attached to a printed circuit board 62 in this instance by use of a series of conventional fasteners, the circuit board including at least a portion of the resident processing circuitry of the thermometry apparatus 50. A first switch assembly is attached to the circuit board 62 adjacent a lower or bottom end 59 of the shroud tube 58, the switch assembly including an actuating arm 66 having a portion that extends into the envelope of the shroud tube. The actuating arm 66 is pivotally attached to the circuit board 62 and relative to a mechanical switch 69 that is also attached to the same side of the circuit board.

Figure 2:
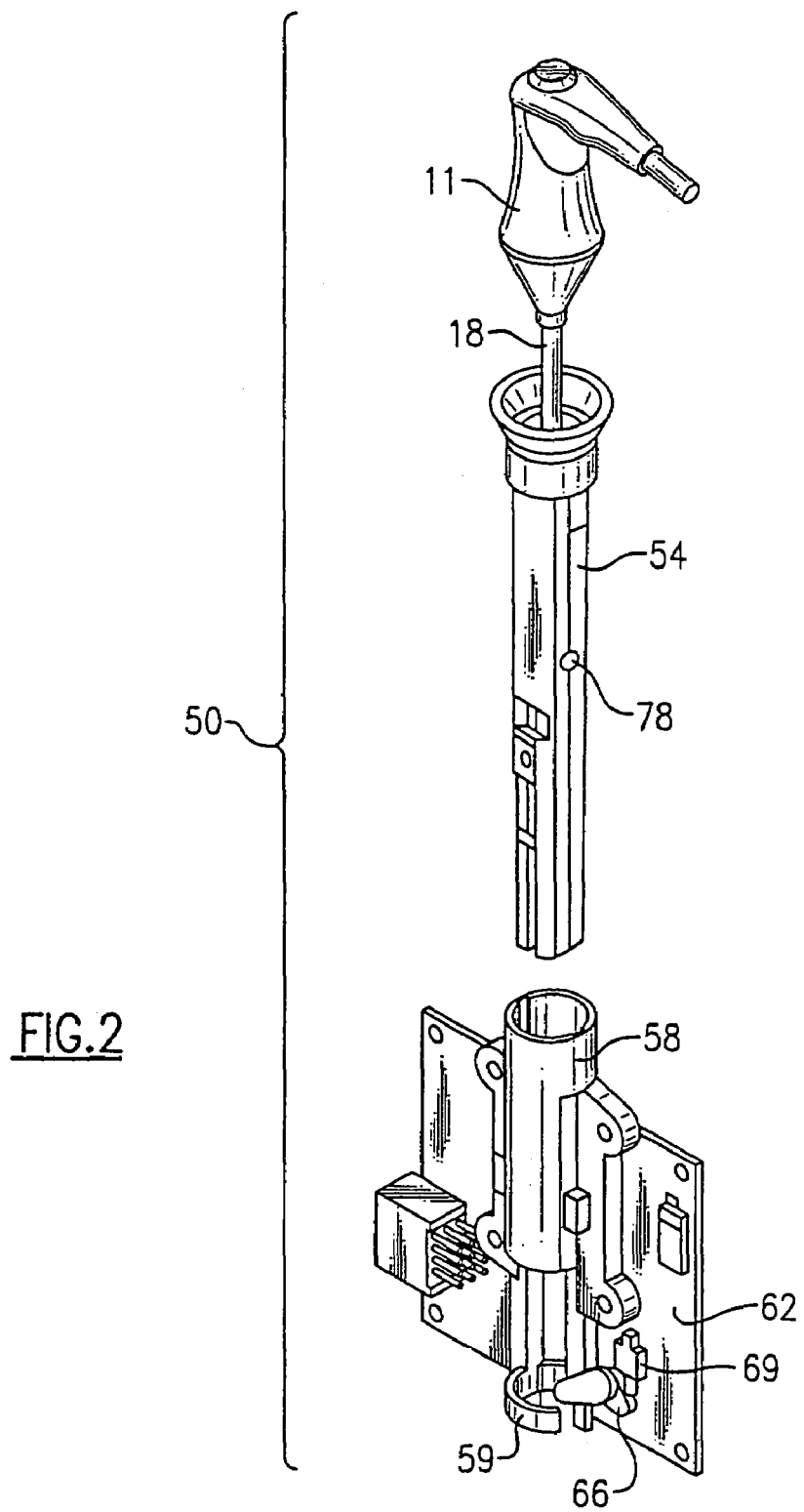
FIG. 2 is a partial exploded view of a thermometry apparatus including a switch assembly in accordance with a preferred embodiment of the invention.

The apparatus 50 includes a second switch assembly that is integrated with the first switch assembly. The second switch assembly includes a miniature light emitter 70 and a corresponding light detector 74, each of which are disposed on opposing sides of the shroud tube 58 at an intermediate distance from the bottom end 59 thereof. The light emitter 70 and detector 74 are each aligned along an optical axis with a pair of light transmissive windows 78 (only one of which is shown in FIG. 2) that are formed in the isolation chamber 54 to permit light to pass when either an empty isolation chamber or no isolation chamber is present in the shroud tube 58. The light emitter 70 preferably is an IR diode, LED, or other light source that emits an infrared light beam that passes along the defined optical axis through the light transmissive material comprising each of the windows 78 of the isolation chamber 54. When an elongate probe is 18 is present within the confines of the isolation chamber 54, the light beam is blocked and not sensed by the light detector 74, such as a photo diode. Therefore, the second switch assembly remains closed.

Figure 5:
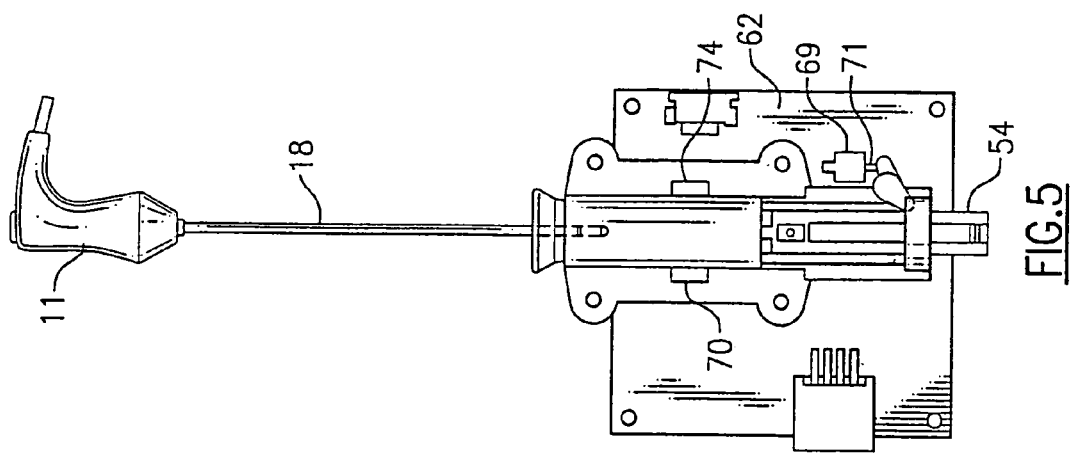
FIG. 5 is a side elevation view of the switch assembly of FIGS. 2–4 depicting the elongate probe as removed from the installed isolation chamber.
Figure 4:
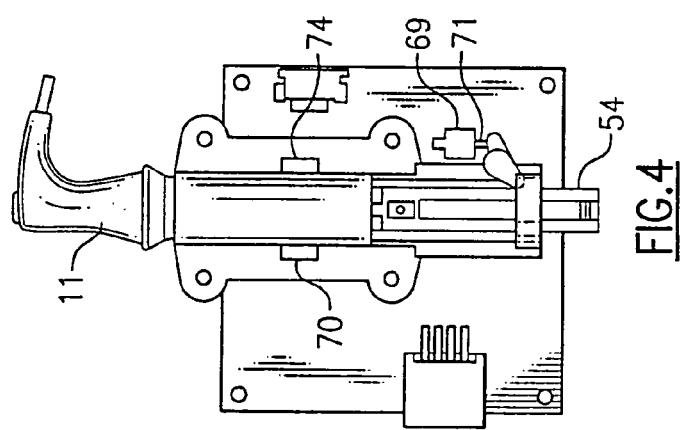
FIG. 4 is a side elevation view of the switch assembly of FIGS. 2 and 3 with an isolation chamber installed therein.
Figure 3:
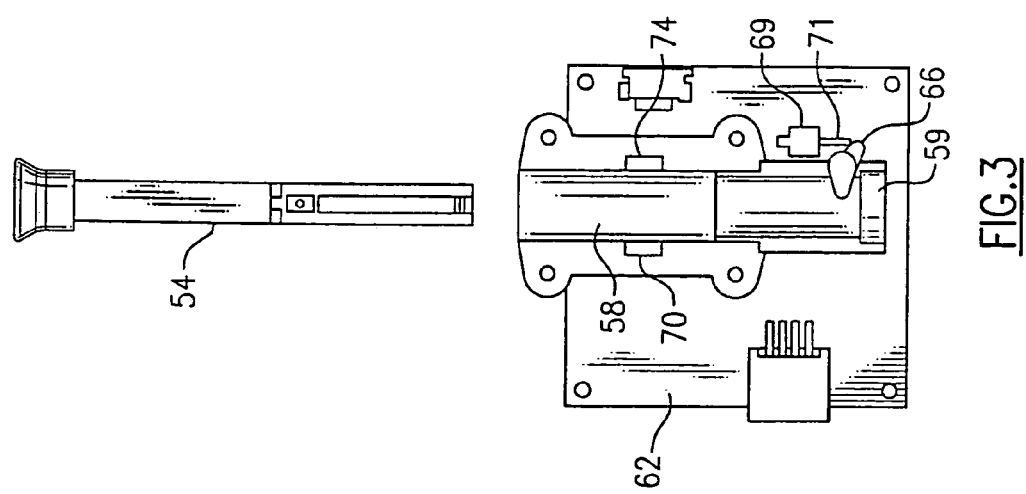
FIG. 3 is a partial side elevation view of the switch assembly of FIG. 2, prior to the installation of an isolation chamber.

In operation and referring to FIGS. 2–5, the isolation chamber 54 is first installed into the thermometry housing 14, FIG. 1, by placing same within the formed cavity 16 of the housing 14, FIG. 1, and aligning the chamber with the top of the opening of the shroud tube 58. As the lower end of the isolation chamber 54 is positioned s that it extends through the bottom end 59 of the shroud tube 58, as shown in FIG. 3, the portion of the actuating arm 66 extending into the envelope of the shroud tube is caused to pivot, in this case in a counterclockwise direction, and the actuating arm causes the closure of the mechanical switch 69 through a resulting inward movement of an actuator 71 thereof. As a result, the first switch assembly is enabled. In the meantime, the thermometry apparatus 50 is not yet powered until the elongate probe 18 has been removed from the isolation chamber 54, as shown in FIG. 5, such that light from the light emitter 70 passes to the detector 74, causing closure of the second switch assembly. When both switch assemblies have been closed, the thermometry apparatus 50 is then automatically powered and is ready for use.

Once a temperature measurement procedure is completed, the elongate probe 18 is reinserted into the isolation chamber 54. This insertion blocks the light beam from the light emitter 70 and reopens the second switch assembly.

Likewise, if the isolation chamber 54 were to be removed from the housing 14, FIG. 1, and the elongate probe 18 were to be inserted into the cavity, the first switch assembly would be reopened because the actuating arm 66 would pivot back to its original position, FIG. 3 and the actuator 71 would no longer be biased into the mechanical switch 69. Therefore, closure of the second switch assembly due to the presence or lack of presence of the probe 18 would be ineffectual as to the automatic powering of the thermometry apparatus 50.

It should be noted that other types of switch assemblies can be used in lieu of the mechanical and optical switch assemblies that are described herein. For example, other suitable switch assemblies, such as, for example, magnetic and/or electrical switches, can be employed.

PARTS LISTS FOR FIGS. 1–5

10 thermometry apparatus
cavity, internal
14 housing
18 elongate probe
22 display
26 user interface
30 control buttons
34 front facing surface
36 cable
40 connector
44 isolation chamber/probe well 48 cavity
50 thermometry apparatus
54 isolation chamber
58 shroud tube
59 bottom end
62 printed circuit board
66 actuating arm
69 mechanical switch
70 photo emitter
71 actuator
74 photo detector
light transmissive windows It will be readily apparent that other modifications and variations are possible within the intended scope of the invention, and as defined according to the following claims.

We claim:

1. A thermometry apparatus comprising:
    a housing having a formed internal cavity;
    an elongate probe that includes at least one temperature responsive element;
    a removable isolation chamber sized for receiving said elongate probe, said isolation chamber being selectively insertable into and removable from said internal housing cavity and said elongate probe being sized for fitting into an elongate enclosed cavity of said isolation chamber;
    a shroud assembly having a bottom end disposed within said housing cavity into which at least a portion of said isolation chamber is received;
    a first switch assembly that is enabled when said isolation chamber is inserted into said shroud assembly, said shroud assembly being attached to said first switch assembly and to a circuit board; and
    a second switch assembly which is enabled when said probe is removed from said isolation chamber that is provided in said housing cavity, said first and second switch assemblies being interconnected such that said thermometry apparatus is not powered unless said first switch assembly and said second switch assembly are each enabled.

2. An apparatus according to claim 1, wherein said first switch assembly is a mechanical switch that is enabled when said isolation chamber is inserted a predetermined distance into said shroud assembly.

3. An apparatus according to claim 1, wherein said second switch assembly comprises an optical switch.

4. An apparatus according to claim 1, wherein said isolation chamber provides a fluid tight seal when said isolation chamber is fitted into said housing cavity.

5. A method for automatically powering a thermometry apparatus, said apparatus comprising a housing having an internal cavity sized for receiving a removable isolation chamber and a probe with at least one temperature sensitive element, said method comprising the steps of:
    enabling a first switch assembly when a removable isolation chamber is inserted into the internal housing cavity, said first switch assembly being attached to a tubular shroud assembly having a bottom end and disposed in said housing cavity said shroud assembly having an opening sized to receive said isolation chamber and attached to a circuit board, said first switch assembly being enabled when said isolation chamber is placed a predetermined distance into the opening of said tubular shroud assembly;
    enabling a second switch assembly when a probe is removed from an isolation chamber provided within the housing cavity; and
    automatically powering said thermometry apparatus when said first and second switch assemblies are each enabled.

6. A method according to claim 5, wherein said second switch assembly comprises an optical emitter and detector disposed on opposing sides of said housing cavity, said isolation chamber including a pair of light transmissive windows to permit light from said light emitter to pass through said isolation chamber when a probe is not present within the cavity of said isolation chamber.

7. A method according to claim 5, wherein said second switch assembly comprises an optical light emitter and detector disposed on opposing sides of said housing cavity, at least a portion of said isolation chamber being made from a light transmissive material to permit light from said emitter to be detected by said detector when a probe is not present in the cavity.

* * * * *

UNITED STATES PATENT AND TRADEMARK OFFICE
CERTIFICATE OF CORRECTION

PATENT NO. : 7,021,824 B2
APPLICATION NO. : 10/689272
DATED : April 4, 2006
INVENTOR(S) : Thaddeus J. Wawro et al.

It is certified that error appears in the above-identified patent and that said Letters Patent is hereby corrected as shown below:

i) in Column 4, Line 21. The reference to "is positioned s" is incomplete and should be replaced with --is positioned such--.

ii) in Column 4, Line 58. The reference to "cavity, internal" should appear as --16 cavity, internal-- and placed in proper chronological order under 14; and iii) in Column 5, Line 12. The reference to "light transmissive windows" should appear as --78 light transmissive windows--.

Signed and Sealed this

Fifteenth Day of August, 2006

JON W. DUDAS
*Director of the United States Patent and Trademark Office*